United States Patent Office

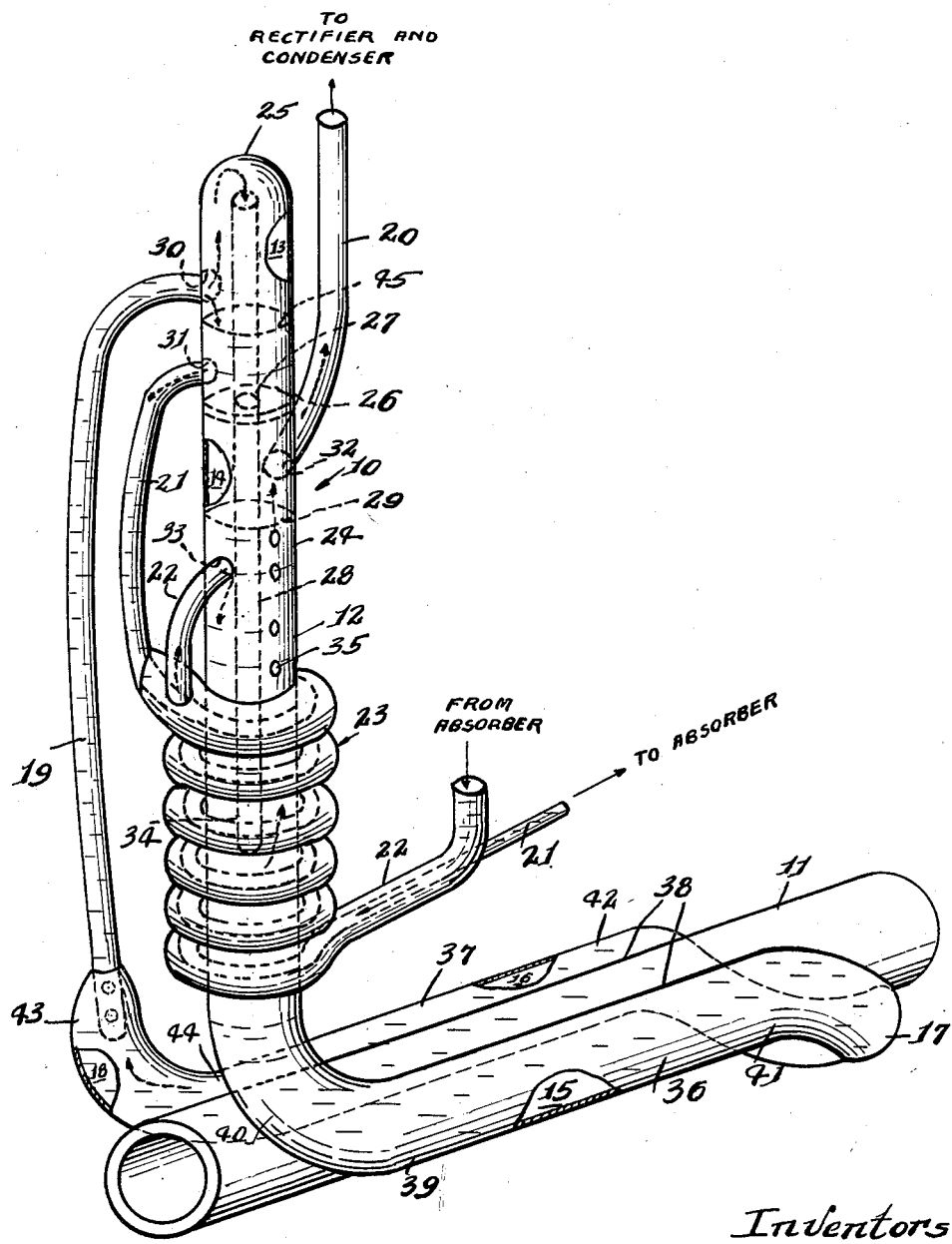

3,124,941
Patented Mar. 17, 1964

3,124,941
GENERATOR FOR AN ABSORPTION SYSTEM
Benjamin A. Phillips and John Roeder, Jr., both of Benton Harbor, Mich., assignors to Whirlpool Corporation, a corporation of Delaware
Filed May 25, 1961, Ser. No. 112,719
2 Claims. (Cl. 62—487)

This invention relates to absorption refrigeration apparatus and in particular to a generator structure for use in such absorption refrigeration apparatus.

In conventional single pressure absorption refrigeration systems a generator is provided for vaporizing the refrigerant from a liquid rich in such refrigerant, conventionally referred to as a rich liquid. Further, the generator pumps the weak liquid, weakened by the vaporization of the refrigerant therefrom, to an elevated portion of the system to provide desired circulation of the liquids therein. The present invention is concerned with such a generator, and comprehends a new and improved construction thereof.

Thus, a principal feature of the present invention is the provision of a new and improved generator structure for use in a single pressure absorption refrigeration apparatus.

Another feature of the invention is the provision of such a generator structure having a simple economical construction.

A further feature of the invention is the provision of a generator structure having improved thermal transfer association with a fire tube of the refrigeration apparatus.

Other features and advantages of the invention will be apparent from the following description taken in connection with the accompanying drawing wherein the figure is a fragmentary perspective of a refrigeration apparatus provided with a generator structure embodying the invention.

In the exemplary embodiment of the invention as disclosed in the drawing, a generator structure generally designated 10 is shown as arranged for use in a refrigeration apparatus including a horizontally extending fire tube 11 in which suitable fuel is burned to provide heat energy for operation of the generator. The generator structure 10 herein comprises a unitary tube member 12 defining a vapor separator space 13, an analyzer space 14, a vaporizing space 15, a pumping space 16, a vapor directing means 17, and a vapor collecting space 18. A pump tube 19 provides communication between the vapor collecting space 18 and the vapor separator space 13. A conduit 20 communicates with analyzer space 14 for delivering the analyzed vapor to an associated rectifier and condenser (not shown) of the refrigeration system. A conduit 21 communicates with the vapor separator space 13 for delivery of the weak liquid therefrom to an absorber (not shown) of the refrigeration system. A conduit 22 communicates with the analyzer space 14 for delivery of the rich liquid from the absorber thereto; as shown, the conduit 21 is disposed concentrically within the conduit 22 in an enlarged integral heat transfer section 23 wrapped around the portion of the tubular member 12 defining the lower portion of analyzer space 14.

More specifically, tube member 12 includes a first upright portion 24 having a closed upper end 25. A disc 26, press fitted in the tubular member portion 24, forms an impervious partition member defining the upper vapor separator space 13 and lower analyzer space 14. The disc 26 is provided with a central opening 27 through which a small diameter tube 28 extends for passing vapor from space 13 downwardly to space 14 wherein the vapor bubbles upwardly through the rick liquid 29 therein to provide analysis thereof. As shown, the tubular member portion 24 is provided with four openings: an opening 30 through which conduit 19 communicates with space 13 in an upper portion thereof; opening 31 providing communication between a lower portion of space 13 and conduit 21; opening 32 providing communication between an upper portion of space 14 and conduit 20; and opening 33 providing communication between conduit 22 and space 14 below opening 32. As shown, the lower end 34 of vapor tube 28 delivers the vapor from the upper portion of space 13 to within liquid 29 substantially below the opening 33 assuring the passage of vapor bubbles 35 upwardly through a substantial height of rich liquid 29 to provide the desired analysis thereof prior to the passing of the vapor outwardly through conduit 20. This passage of the vapor through the rich liquid also furnishes the correct reaction head within space 13 to provide sufficient pressure to the weak liquid leaving space 13 by means of conduit 21 for proper delivery to the absorber (not shown). It will be apparent that varying the length of tube 28 will provide a means of varying the pumping rate of the generator assembly.

Tube member 12 further includes a second, substantially horizontal portion 36 defining the vaporizing space 15 and a third, substantially horizontal portion 37 defining the pumping space 16. As shown, the tube member portions 36 and 37 extend parallel to each other and are spaced apart a distance substantially equal to the outside diameter of fire tube 11 disposed therebetween. Controlled heat transfer is provided between fire tube 11 and the tube member portions 36 and 37 by means of a plurality of seam welds 38 therebetween, the specific amount of metallic bond formed by these welds 38 being preselected to provide a preselected thermal transfer rate. Tube member portion 36 is connected at one end 39 to the lower end 40 of tube member portion 24. Vapor directing means 17 comprises a connecting portion of the tube member 12 connected to the other end 41 of tube member portion 36 and to the corresponding end 42 of tube member portion 37, connecting portion 17 being downturned to pass under the fire tube 11 at a horizontal level below that of tube portions 36 and 37.

Vapor collecting space 18 is defined by a fifth, upright portion 43 of the tube member 12 connected to the other end 44 of the horizontal portion 37 for conducting the vaporized refrigerant from heated tube member portion 37 through conduit 19 to the vapor separator space 13. In addition, the tube member portions 36 and 37 are positioned at a slight angle from horizontal with the ends 41 and 42 being slightly lower than the ends 39 and 44, to allow the proper passage of vapor formed in the spaces 15 and 16. Thus, any vapor created in vaporizing space 15 will pass toward end 39 and up the vertical portion 24. Similarly, the vapor created in space 16 will pass into portion 43. Since the top of vapor directing means 17 is lower than the liquid levels within spaces 15 and 16, proper dividing of the two vapor streams is provided.

In operation, the rich liquid from the associated absorber is delivered to the analyzer space 14 of tube member portion 24 through the conduit 22, being preheated in the heat transfer portion 23. The rich liquid then passes downwardly to tube member portion 15 and thence through connecting portion 17 to pumping portion 37. The heat generated in the rich liquid in tube member portions 36 and 37 causes the refrigerant to vaporize in portions 36 and 37. The relatively low connecting portion 17 prevents the vapor formed in space 16 from passing backwardly from space 16 to space 15 and, thus, the vapor passes upwardly through collecting space 18 and conduit 19 to the vapor separating space 13 at the upper end of the tube member portion 24. As the vapor passes upwardly through conduit 19, it carries with it slugs of liquid from space 16, which liquid has now become weak liquid as the result of the vaporization of the refrigerant therefrom. This weak liquid 45 collects in vapor separator space 13 above disc 26 and passes outwardly therefrom through conduit 21, in heat transfer association with the incoming rich liquid in portion 23, for delivery to the associated absorber. The vapor delivered to space 13 passes firstly downwardly through vapor tube 28 into the rich liquid in analyzer space 14 and then upwardly through the rich liquid in the form of bubbles 35 for delivery through conduit 20 to the associated rectifier and condenser.

As indicated briefly above, the rate of generation of the refrigerant vapor may be controlled by controlling the amount of metallic bond between the fire tube 11 and the tube member portions 36 and 37, thus avoiding the need to change internal components such as the tube 28 to obtain different desired rates. As generator structure portion 24, portion 36, portion 17, portion 37, and portion 43 are formed integrally as a unitary tube member, an improved rigid, economical structure is provided.

It will be apparent that fire tube 11 could be eliminated if desired and heat applied directly to portions 15 and 16 by means such as long fuel burners beneath the portions 15 and 16.

Having described our invention as related to the embodiment shown in the accompanying drawing, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. In a generator for use in an absorption refrigeration apparatus, structure comprising: a unitary tube member having an upright portion closed at the upper end thereof, a first substantially horizontal portion connected at one end to the lower end of the upright portion and defining a vaporizing space, a second substantially horizontal portion extending parallel to and spaced horizontally laterally of said first horizontal portion defining a pumping space, a connecting portion connecting the other end of the first horizontal portion to the corresponding end of the second horizontal portion, said connecting portion extending to a horizontal level below that of said first and second horizontal portions and defining a vapor directing means; and a partition member transversely dividing the interior of said upright portion into an upper vapor separating space and a lower analyzer space, said upright portion being provided with a first opening communicating with said vapor separating space and a second opening communicating with said analyzer space, for passing weak liquid from said vapor generating space and delivering rich liquid to said analyzer space.

2. The generator structure of claim 1 wherein said upright portion is further provided with a third opening communicating with said analyzer space above said second opening, for passing refrigerant vapor therefrom.

References Cited in the file of this patent

UNITED STATES PATENTS

| | | |
|---|---|---|
| 2,337,653 | Ehnbom | Dec. 28, 1943 |
| 2,721,455 | Hellstrom | Oct. 25, 1955 |